(12) United States Patent
Kisor

(10) Patent No.: US 6,880,782 B2
(45) Date of Patent: Apr. 19, 2005

(54) CONTROL SYSTEM FOR ROTORCRAFT FOR PREVENTING THE VORTEX RING STATE

(75) Inventor: Ronald L. Kisor, Coppell, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 10/430,501

(22) Filed: May 6, 2003

(65) Prior Publication Data

US 2005/0001092 A1    Jan. 6, 2005

(51) Int. Cl.[7] .............................................. B64C 27/57
(52) U.S. Cl. ................................. 244/17.13; 244/17.25
(58) Field of Search .......................... 244/17.13, 17.23, 244/17.25, 76 R, 66, 56, 7 C, 7 R, 12.4; 416/133, 416/130, 121

(56) References Cited

U.S. PATENT DOCUMENTS

| | | | |
|---|---|---|---|
| 6,260,796 B1 * | 7/2001 | Klingensmith | 244/23 R |
| 6,340,133 B1 * | 1/2002 | Capanna | 244/6 |
| 6,457,672 B1 * | 10/2002 | Tai | 244/56 |
| 6,644,588 B1 * | 11/2003 | King et al. | 244/7 A |
| 6,655,631 B1 * | 12/2003 | Austen-Brown | 244/12.4 |
| 6,695,264 B1 * | 2/2004 | Schaeffer et al. | 244/223 |

OTHER PUBLICATIONS http://www.fas.org/man/dod-101/sys/ac/v-22.htm.*
http://198.65.138.161/military/systems/aircraft/v-22-cockpit.htm.*
http://www.boeing.com/rotorcraft/military/v22/w22160-01.html.*

* cited by examiner

Primary Examiner—Peter M. Poon
Assistant Examiner—Timothy D Collins
(74) Attorney, Agent, or Firm—James E. Walton

(57) ABSTRACT

A flight control system for a rotorcraft to prevent the adverse effects of the vortex ring state is disclosed. In the flight control system of the present invention, selected control inputs are sent the rotorcraft prior to the onset of the vortex ring state. In the preferred embodiment, the control inputs are transient, do not require input from the pilot, and do not affect the flight path of the rotorcraft.

2 Claims, 5 Drawing Sheets

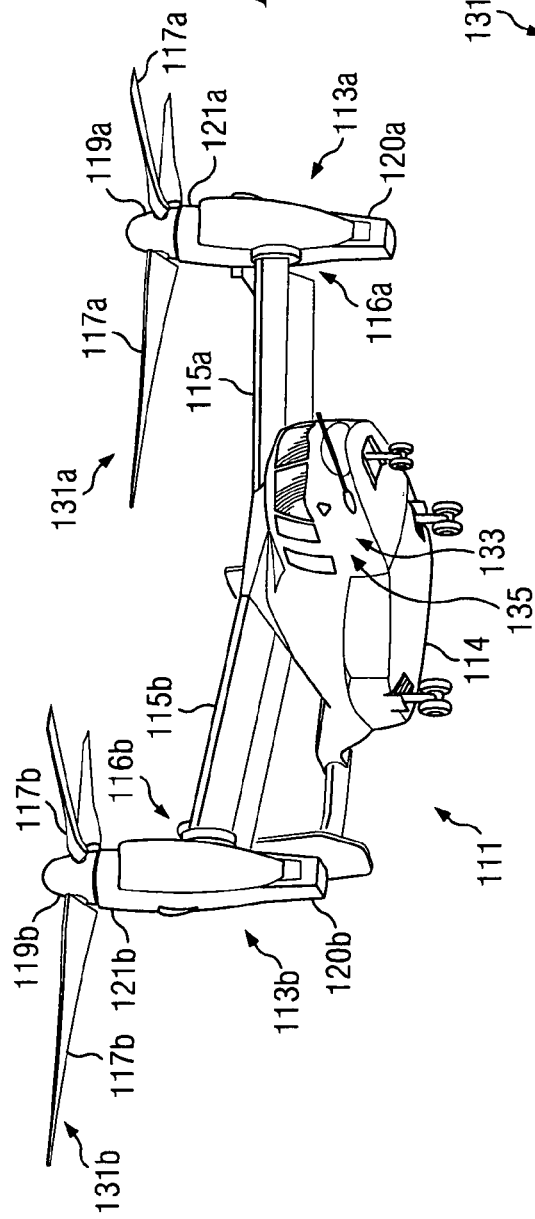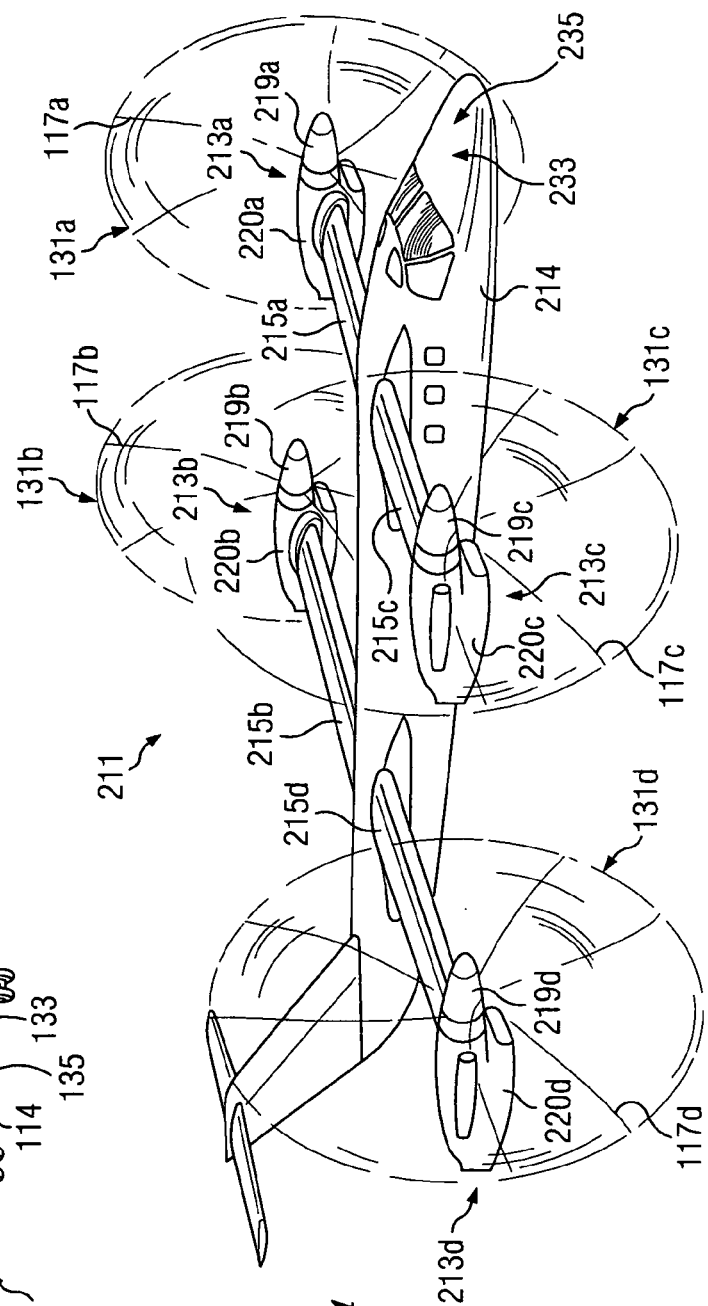

CONTROL SYSTEM FOR ROTORCRAFT FOR PREVENTING THE VORTEX RING STATE

BACKGROUND

1. Field of the Invention

The present invention relates to flight control systems for rotorcraft.

2. Description of Related Art

There are many different types of rotorcraft, including: helicopters, tandem rotor helicopters, tiltrotor aircraft, four-rotor tiltrotor aircraft, tilt wing aircraft, and tail sitter aircraft. In all of these rotorcraft, thrust and/or lift is generated by air flowing through a rotor disk formed by rotating rotor blades.

There are three basic flow states for the air flow through the rotor disk of a rotorcraft: (1) the normal working state; (2) the windmill-brake state; and (3) the vortex ring state. These three flow states are typically described in terms of hover induced velocity, which is determined from the momentum theory. The basic premise of momentum theory is that a definite wake field exists far downstream of a hovering rotor. However, when a rotorcraft begins to descend, the assumptions of the momentum theory begin to break down. The normal working state, the windmill-brake state, and the vortex ring state are shown schematically in FIGS. 1A–1C, respectively.

Referring to FIG. 1A in the drawings, the normal working state of a rotorcraft is illustrated schematically. In the normal working state, the air approaches the rotor in the same direction as the induced velocity, i.e., the air flow is downward through the rotor disk. In the normal working state, a definite slip stream exists and the air flow at the rotor disk is always equal to or greater than the induced velocity. The normal working state can exist for rates of climb in the range of zero, i.e., hovering, to infinity.

Referring now to FIG. 1B in the drawings, the windmill-brake state is illustrated schematically. In the windmill-brake state, the air approaches the rotor in the opposite direction of the induced velocity, i.e., the air flow is upward through the rotor disk. In the windmill-brake state, a definite slipstream exists; however, the induced velocity, which opposes the main air flow, causes a decrease in the velocity of the air flow as the air flow approaches and passes through the rotor disk. This causes the slipstream to expand above the rotor disk. For low rates of descent, the expansion of the slipstream is very large, and substantial recirculation and turbulence are generated.

Referring now to FIG. 1C in the drawings, the vortex ring state is illustrated schematically. In the vortex ring state, the air flow is also downward, because of the large induced velocity; however, the air flow far above the rotor is in an upward direction. In the vortex ring state, the definite slipstream is replaced by large recirculating air flows. The vortex ring state can exist for rates of descent in the range of zero, i.e., hovering, to twice the average induced velocity. At high rates of descent and low horizontal airspeeds, the low wake skew angle and high rotor vertical velocity cause the rotor to re-ingest its wake. Higher collective pitch angles, and thus power, are necessary to maintain constant thrust levels when this occurs. As a result, the vortex ring state is sometimes called "power settling" or "settling with power."

Existing test data indicates that the vortex ring state is limited to a small range of horizontal airspeeds and vertical velocities proportional to the momentum theory prediction for the rotor's hover induced velocity. The most likely scenario for a rotorcraft to encounter the vortex ring state is during a rapid descent to a landing, especially with an unexpected tailwind component. Operation within these boundaries is highly unsteady and can lead to temporary, and sometimes catastrophic, loss of control. Common precursors to fully developed vortex ring state include thrust fluctuations, erratic rotor flapping, high vibrations, and aural rumbling.

SUMMARY OF THE INVENTION

There is a need for a flight control system for preventing the vortex ring state in rotorcraft.

Therefore, it is an object of the present invention to provide a flight control system for preventing the vortex ring state in rotorcraft.

These and other objects are achieved by providing a flight control system whereby selected control inputs are sent the rotorcraft prior to the onset of the vortex ring state. In the preferred embodiment, the control inputs are transient, do not require input from the pilot, and do not affect the flight path of the rotorcraft.

The present invention provides significant advantages, including: (1) the vortex ring state can be prevented without input from the pilot; (2) the control inputs that prevent the vortex ring state can be chosen such that the flight path of the rotorcraft is not affected; and (3) the vortex ring state can be delayed without input from the pilot.

Additional objectives, features and advantages will be apparent in the written description which follows.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

FIG. 3B is a perspective view of another tiltrotor aircraft having a flight control system for preventing the adverse effects of the vortex ring state according to the present invention in a helicopter mode;

FIG. 4 is a perspective view of a Quad tiltrotor aircraft having a flight control system for preventing the adverse effects of the vortex ring state according to the present invention in the airplane mode;

DETAILED DESCRIPTION OF THE PREFERRED EMBODIMENT

Figure 1A:
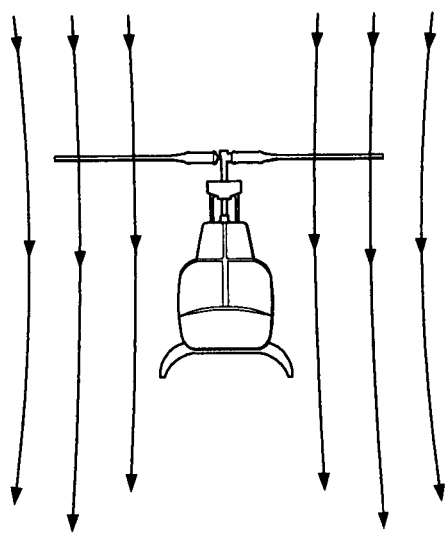
FIG. 1A is a schematic illustrating the normal working state air flow state for a rotorcraft.
Figure 1B:
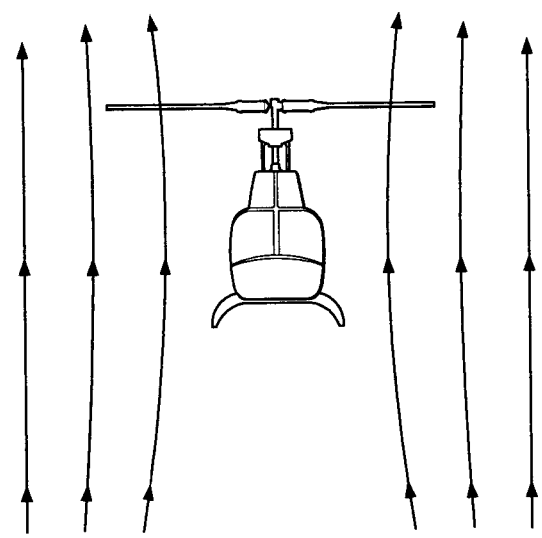
FIG. 1B is a schematic illustrating the windmill-brake state air flow state for a rotorcraft.
Figure 1C:
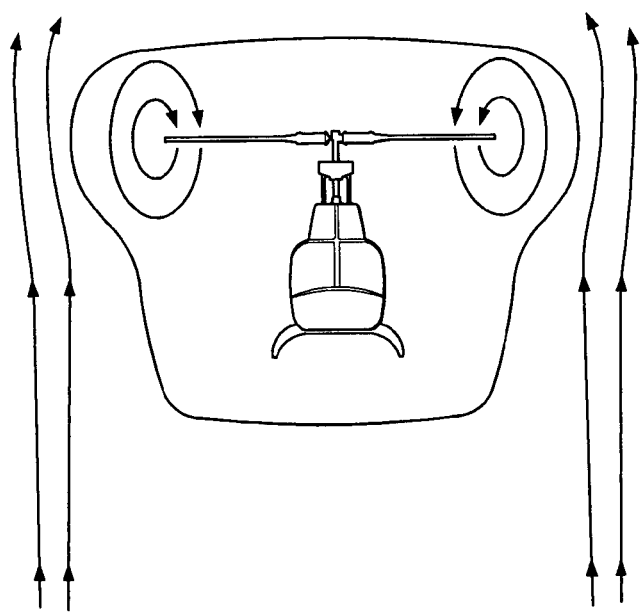
FIG. 1C is a schematic illustrating the vortex ring state air flow state for a rotorcraft.
Figure 2:
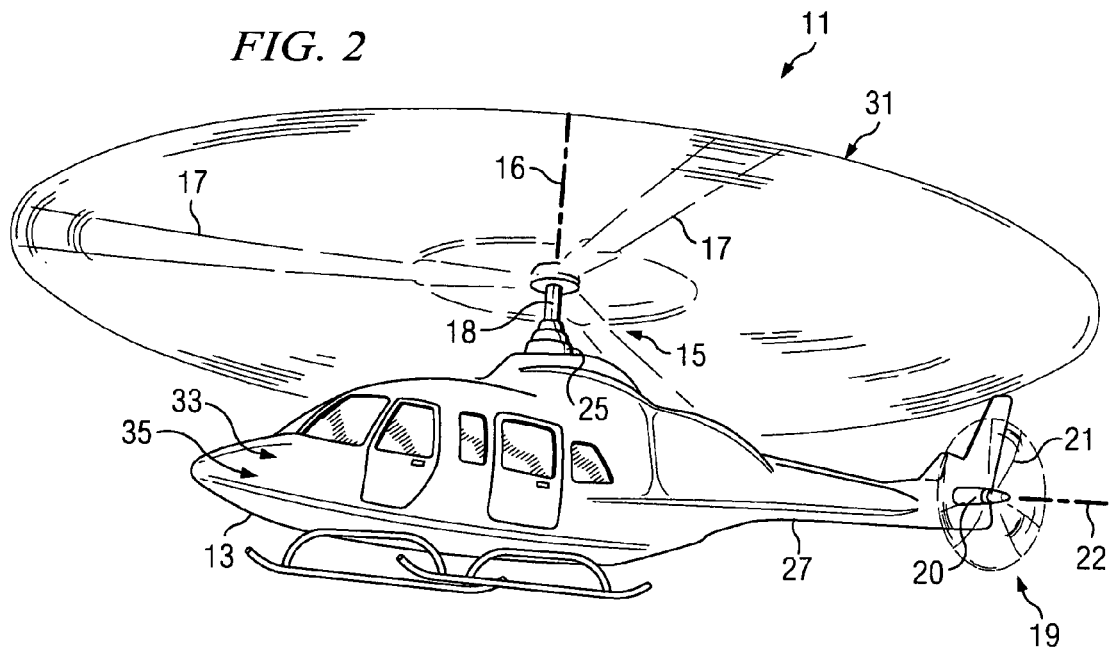
FIG. 2 is a perspective view of a helicopter having a flight control system for preventing the adverse effects of the vortex ring state according to the present invention.

The present invention represents a means of preventing or delaying the vortex ring state for any type of rotorcraft. Although the present invention may be described with reference to tiltrotor aircraft, such as those depicted in FIGS. 3A and 3B, it should be understood that the present invention may be used on other types of rotorcraft, such as helicopters, as depicted in FIG. 2, tilt wing aircraft, and tail sitter aircraft. It will also be appreciated that both the civilian and military tiltrotor aircraft described herein may have two wing assemblies and two tiltrotor assemblies, or may be "Quad" type tiltrotor aircraft having four wing members and four tiltrotor assemblies, as depicted in FIG. 4. In addition, it will be appreciated that the present invention is particularly well suited for rotorcraft that are unmanned aerial vehicles.

Referring to FIG. 2 in the drawings, a helicopter 11 having a flight control system for preventing the vortex ring state according to the present invention is illustrated. Helicopter 11 has a fuselage 13 and a main rotor assembly 15, including main rotor blades 17 and a main rotor shaft 18. Helicopter 11 has a tail rotor assembly 19, including tail rotor blades 21 and a tail rotor shaft 20. Main rotor blades 17 generally rotate about a longitudinal axis 16 of main rotor shaft 18. Tail rotor blades 21 generally rotate about a longitudinal axis 22 of tail rotor shaft 20. Main rotor blades 17 and tail rotor blades 21 are driven by a drive means 25 carried by fuselage 13. The rotation of main rotor blades 17 defines a rotor disk, or rotor 31. The operation of helicopter 11 is controlled by an automatic flight control system 33 that includes or is connected to a control system 35 according to the present invention that is adapted to prevent or delay the vortex ring state.

Figure 3A:
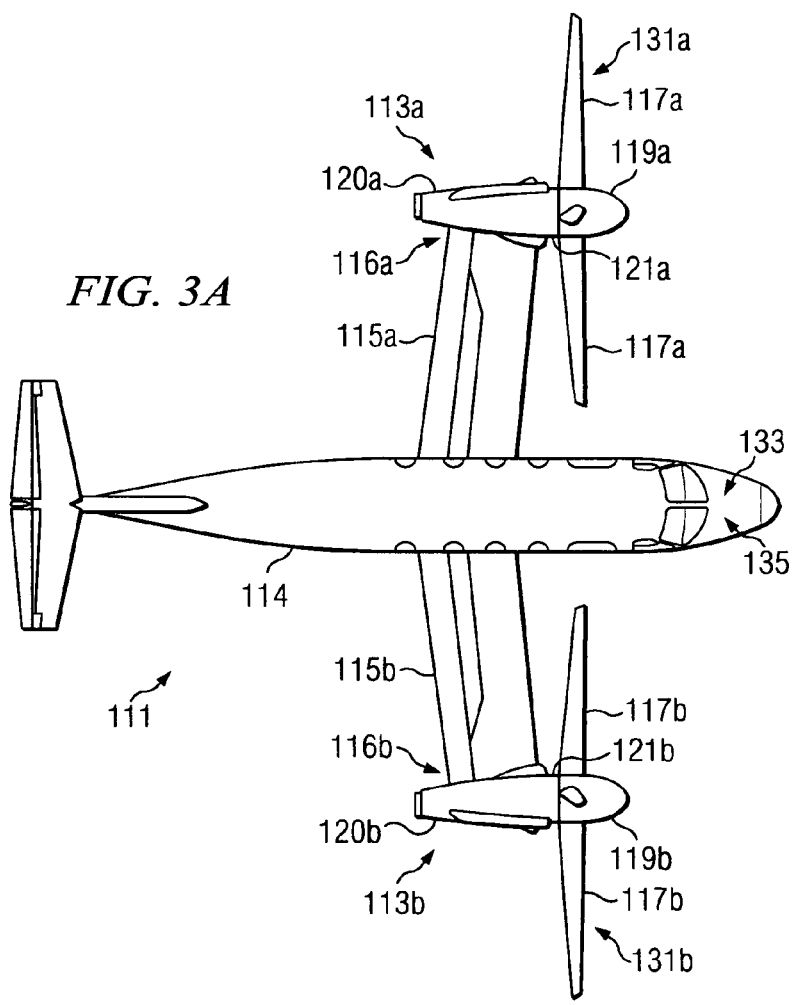
FIG. 3A is a plan view of a tiltrotor aircraft having a flight control system for preventing the adverse effects of the vortex ring state according to the present invention in an airplane mode.

The present invention may also be utilized on other types of rotary wing aircraft. Referring now to FIGS. 3A and 3B in the drawings, a tiltrotor aircraft 111 according to the present invention is illustrated. As is conventional with tiltrotor aircraft, tiltrotor assemblies 113a and 113b are carried by wings 115a and 115b, and are disposed at end portions 116a and 116b of wings 115a and 115b, respectively. Tiltrotor assemblies 113a and 113b include nacelles 120a and 120b, which carry the engines and transmissions of tiltrotor aircraft 111, as well as, rotor hubs 119a and 119b on forward ends 121a and 121b of tiltrotor assemblies 113a and 113b, respectively. Proprotor blades 117a and 117b are connected to rotor hubs 119a and 119b, respectively. The rotation of proprotor blades 117a and 117b define respective rotor disks, or rotors 131a and 131b.

Tiltrotor assemblies 113a and 113b move or rotate relative to wing members 115a and 115b between a helicopter mode in which tiltrotor assemblies 113a and 113b are tilted upward, such that tiltrotor aircraft 111 flies like a conventional helicopter; and an airplane mode in which tiltrotor assemblies 113a and 113b are tilted forward, such that tiltrotor aircraft 111 flies like a conventional propeller driven aircraft. As shown in FIGS. 3A and 3B, wings 115a and 115b are coupled to a fuselage 114. In FIG. 3A, tiltrotor aircraft 111 is depicted as a civilian-type tiltrotor aircraft, and is shown in the airplane mode; and in FIG. 3B, tiltrotor aircraft 111 is depicted as a military-type tiltrotor aircraft, and is shown in the helicopter mode. The operation of tiltrotor aircraft 111 is controlled by an automatic flight control system 133 that includes or is connected to a control system 135 according to the present invention that is adapted to prevent or delay the vortex ring state.

Referring now to FIG. 4 in the drawings, a Quad tiltrotor aircraft 211 according to the present invention is illustrated. As with the tiltrotor aircraft of FIGS. 3A and 3B, tiltrotor assemblies 213a, 213b, 213c, and 213d are carried by wings 215a, 215b, 215c, and 215d, respectively. Tiltrotor assemblies 213a, 213b, 213c, and 213d include nacelles 220a, 220b, 220c, and 220d, which carry the engines and transmissions of Quad tiltrotor aircraft 211, as well as, rotor hubs 219a, 219b, 219c, and 219d on forward ends of tiltrotor assemblies 213a, 213b, 213c, and 213d, respectively. Proprotor blades 217a, 217b, 217c, and 217d are connected to rotor hubs 219a, 219b, 219c, and 219d, respectively. The rotation of proprotor blades 217a, 217b, 217c, and 217d define respective rotor disks, or rotors 231a, 231b, 231c, and 231d.

Tiltrotor assemblies 213a, 213b, 213c, and 213d move or rotate relative to wing members 215a, 215b, 215c, and 215d between a helicopter mode in which tiltrotor assemblies 213a, 213b, 213c, and 213d are tilted upward, such that Quad tiltrotor aircraft 211 flies like a conventional helicopter; and an airplane mode in which tiltrotor assemblies 213a, 213b, 213c, and 213d are tilted forward, such that Quad tiltrotor aircraft 211 flies like a conventional propeller driven aircraft. Wings 215a, 215b, 215c, and 215d are coupled to a fuselage 214. Quad tiltrotor aircraft 211 is shown in the airplane mode. The operation of Quad tiltrotor aircraft 211 is controlled by an automatic flight control system 233 that includes or is connected to a control system 235 according to the present invention that is adapted to prevent or delay the vortex ring state.

It will be appreciated that automatic flight control systems 33, 133, and 233 may include one or more flight control computers connected to various aircraft components, and many different sensors for sensing a wide variety of operational parameters of the rotorcraft. It should be understood that control systems 35, 135, and 235 may either be integral with automatic flight control systems 33, 133, and 135, or may form separate components that work in conjunction with automatic flight control systems 33, 133, and 135. Thus, automatic flight control systems 33, 133, and 233 are programmed to perform many functions other than those described herein for preventing and delaying the vortex ring state.

Although the following discussion is with respect to tiltrotor aircraft 111, as shown in FIG. 3B, it should be understood that the following discussion applies to all of the rotorcraft shown and described herein.

The "onset" of the vortex ring state can be defined in many ways. However, for purposes of the present invention, onset of the vortex ring state will be defined as the first instance that sustained pilot response is necessary to maintain control of the aircraft. More specifically, the onset of the vortex ring states occurs whenever the sustained difference between the expected differential between the thrust from left rotor 131a and the thrust from right rotor 131b exceeds 2000 pounds, which is typically the authority limit of automatic flight control system 133. Furthermore, "sustained" is defined herein as any duration of time exceeding about 1 second.

Rotorcraft are susceptible to the vortex ring state when they are traveling at low horizontal velocities and high rates of descent. In general, the onset of the vortex ring state in tiltrotor aircraft 111 is preceded by several cues, including thrust fluctuations, asymmetric thrust, erratic rotor flapping, high vibrations, and aural rumbling. These cues are consistent with those reported from vortex ring state testing on conventional rotorcraft.

For example, if tiltrotor aircraft 111 is at a constant horizontal velocity of less than 40–50 knots and descending at a rate of about 1,000 feet per minute, thrust fluctuations between rotors 131a and 131b can begin. These thrust fluctuations typically act symmetrically, so no loss of lateral control is experienced. Lateral control is retained because the lateral control of tiltrotor aircraft 111 is typically derived from the differential thrust between rotors 131a and 131b. The magnitude of these thrust fluctuations can grow to as large as 10% of the mean thrust with increasing rates of descent. These thrust fluctuations are periodic and typically have oscillation frequencies of about 0.5–1.0 Hz.

As the rate of descent increases, the periodic character of these thrust fluctuations abruptly changes, and mean thrust asymmetries between rotors 131a and 131b begin to grow. At first, these mean thrust asymmetries are easily handled by automatic flight control system 133. However, as the rate of descent continues to increase, the authority limits of automatic flight control system 133 become saturated. At that point, pilot reaction is then required to maintain wings 115a and 115b level.

Further increases in the rate of descent leads to mean thrust asymmetry levels that are beyond the pilot's capabilities to counter, and uncommanded lateral rolls, referred to herein as "roll-offs," occur. For tiltrotor aircraft 111, recovery from a roll-off can often be accomplished by rotating nacelles 120a and 120b forward into the airplane mode. This transition from the helicopter mode to the airplane mode clears rotors 131a and 131b from the vortex ring state, and returns full control response to the pilot. However, it will be appreciated that there are many instances in which the pilot is unable to transition into airplane mode, or is unable to fly forward. For example, if the pilot is flying in formation, he may not be able to transition tiltrotor aircraft 111 into airplane mode or fly forward, as such a maneuver may cause a collision with other aircraft.

For helicopters, recovery from the vortex ring state requires either speeding up or "falling through" the vortex ring state. Helicopters fall through the vortex ring state by attaining rates of descent that are higher than about 2,500 feet per minute. However, it will be appreciated that, as with tiltrotor aircraft, there are many instances in which the pilot is unable to speed up or does not have enough altitude to fall through the vortex ring state. This is particularly true for tandem rotor helicopters.

Figure 5:
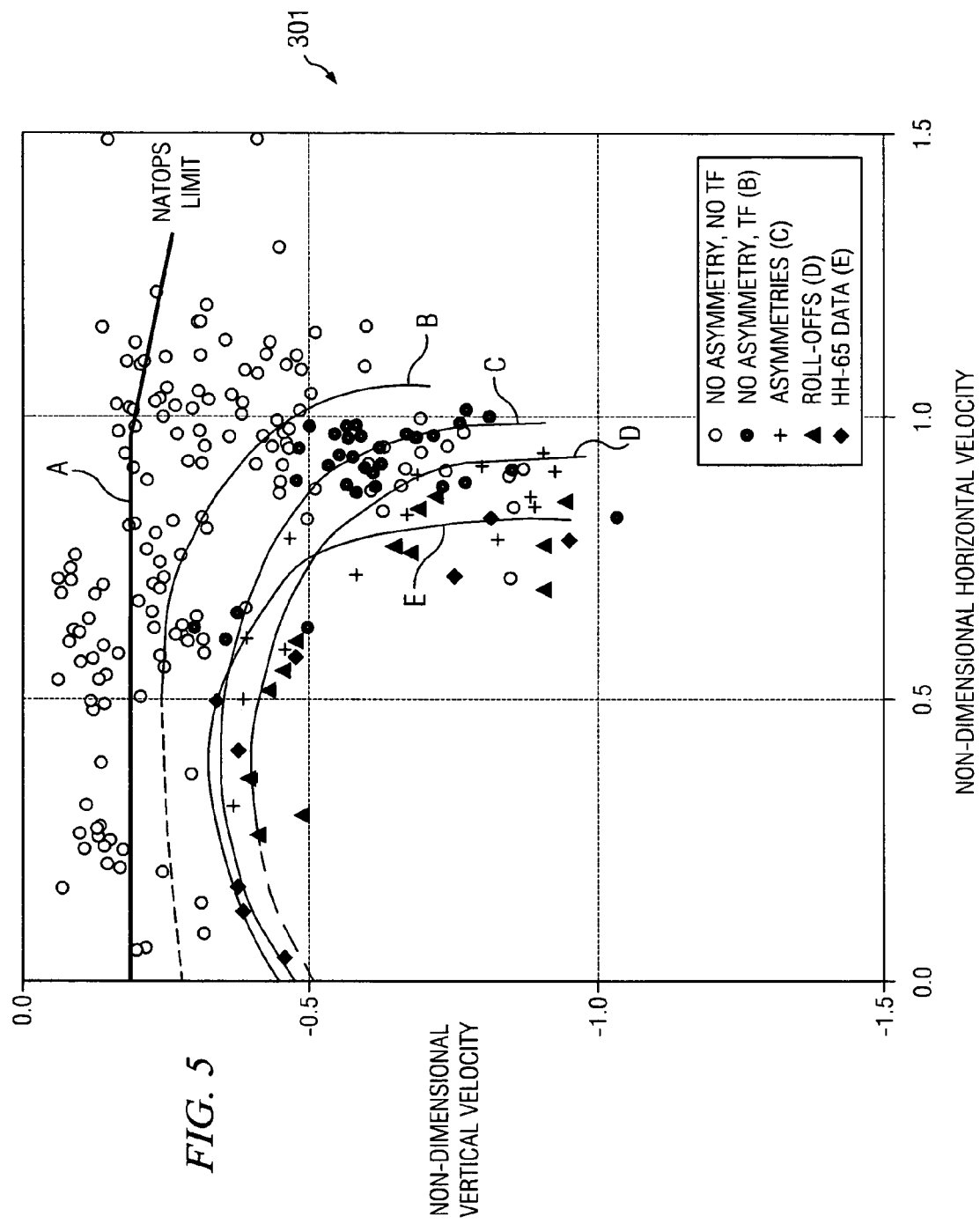
FIG. 5 is a chart of vertical velocity vs. horizontal airspeed.

Referring now to FIG. 5 in the drawings, a chart 301 of vertical velocity, or rate of descent, vs. horizontal airspeed is illustrated. The data in chart 301 is non-dimensional, in that the values are independent of the gross weight of the aircraft and of the air density ratio. The data in chart 301 has been normalized based upon the hover induced velocity from the momentum theory. By normalizing the data, the curves in the chart are valid for various types of rotorcraft. However, all of the data points except those indicated by diamond-shaped points, are representative of a tiltrotor aircraft, such as tiltrotor aircraft 111. The diamond-shaped data points represent data from a test of an Aerospatial HH-65 helicopter. This data is included to show that helicopter rotors and tiltrotor aircraft rotors behave in a similar fashion relative to the vortex ring state.

In chart 301, curve A represents the NATOPS limit, which is the operating limit for the aircraft as expressed in the operating manuals. Curve B represents the top of the scatter of data points for which there is no sustained asymmetric thrust greater than about 1,000 pounds, but there are thrust fluctuations between the rotors greater than about 2.5%. Curve C represents the top of the scatter of data points for which there is sustained asymmetric thrust between the rotors of greater than about 1,000 pounds, and thrust fluctuations greater than about 2.5% between the rotors. Curve C also represents a condition in which the authority limits of automatic flight control system 135 are at about 50%. Curve D represents the top of the scatter of data points for which there is sustained asymmetric thrust between the rotors of greater than about 2,000 pounds, and thrust fluctuations greater than about 2.5% between the rotors. Curve D also represents a condition in which the authority limits of automatic flight control system 135 are at 100%, i.e., saturated. Curve D is indicative of when roll-offs occur, i.e. the onset of the vortex ring state. Thus, curve B represents situations in which there is little or no impact on controllability, and curves C and D represent situations in which controllability is increasingly degraded. Curve E represents the top of the scatter of data points for which the Aerospatial helicopter entered the vortex ring state.

Figure 6:
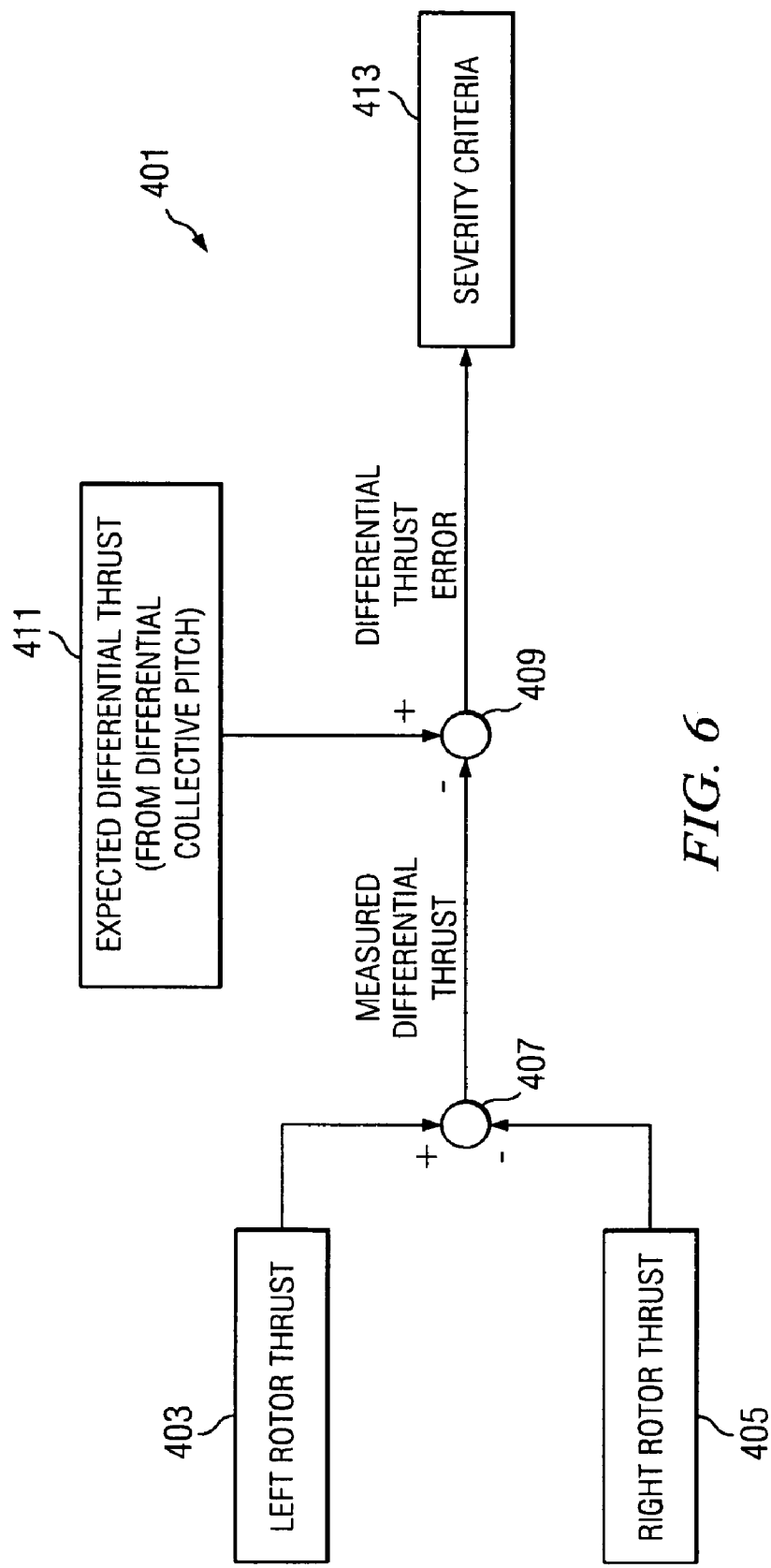
FIG. 6 is a schematic flow diagram of the methodology of the present invention.

Referring now to FIG. 6 in the drawings, the methodology of the present invention is illustrated schematically by a flow diagram 401. Rotor thrust measurements allow detailed insight into how the vortex ring state affects the overall aircraft response. The impact of the vortex ring state is categorized by a deviation from normal thrust conditions. As shown in flow diagram 401, the thrust of the left rotor and the thrust of right rotor are measured, as indicated by boxes 403 and 405, respectively. These thrust measurements are compared at box 407 to generate a measured differential thrust. This measured differential thrust is then compared at box 409 to an expected differential thrust, which is represented by box 411. This comparison at box 409 generates a differential thrust error which can be used to determine a selected severity criteria, which is represented by box 413. This methodology is performed by control system 135, which, as explained above, may be integral with automatic flight control system 133. In operation, the differential thrust error and the severity criteria 413 are determined, and then control system 135 sends the appropriate control inputs to tiltrotor aircraft 111, depending upon selected values of the differential thrust error and the severity criteria 413.

Control system 135 provides a solution to the vortex ring state problem. By adding selected control inputs prior to the onset of the vortex ring state, the vortex ring state can be prevented or delayed. It is preferred that the control inputs be transient and undetectable by the pilot. For tiltrotor aircraft, such as tiltrotor aircraft 111, the selected control input is triggered when the horizontal airspeed of tiltrotor aircraft 111 is in the range of about 40–50 knots, and when the rate of descent is about 1,000 feet per minute. For other rotorcraft, the selected control input is triggered based upon the non-dimensional model represented by chart 301. The actual selected control input is preferably an opposed lateral cyclic that moves rotors 131a and 131b inboard and outboard in the range of 1–4° lateral cyclic. These opposed lateral cyclic inputs are preferred because they can be undetectable to the pilot and typically do not affect the flight path of the aircraft. However, it should be understood that the control signals may comprise a wide variety of cyclic inputs, collective inputs, or combinations of both. In an alternate embodiment of the present invention, a tactile cue or other type of warning or notification is generated by control system 135 and sent to the pilot to inform the pilot of the activation of control system 135.

For helicopters, such as helicopter 11, it is preferred that the selected control input be an oscillatory collective input. Although this maneuver may effect the flight path of the helicopter, it will prevent helicopter 11 from entering the vortex ring state. In addition, flapping rotor 31 as a control input may also prevent helicopter 11 from entering the vortex ring state. For tandem rotor helicopters, it is preferred that the selected control input be opposed fore and aft cyclic.

Until now, dynamic testing of rotors in the vortex ring state has not been performed, because it was thought that once the boundaries of the vortex ring state were crossed, that it was inevitable the aircraft would enter the vortex ring state. However, by utilizing the methods of the present invention, it has been determined that rotors can be driven through regimes that were once thought to be in the vortex ring state. Thus, the present invention allows rotors to operate in what was once thought to be within the boundaries of the static vortex ring state, without the adverse effects of the vortex ring state.

It is apparent that an invention with significant advantages has been described and illustrated. Although the present invention is shown in a limited number of forms, it is not limited to just these forms, but is amenable to various changes and modifications without departing from the spirit thereof.

I claim:

1. A control system for preventing a rotorcraft having a rotor disk from entering a sustained vortex ring state comprising:
   a sensor for sensing a current forward airspeed of the rotorcraft;
   a sensor for sensing a current rate of descent of the rotorcraft relative to the rotor disk;
   a selected flight regime defined by a preselected forward airspeed and a preselected rate of descent relative to the rotor disk;
   a control algorithm for comparing the current forward airspeed and the current rate of descent relative to the rotordisk to the selected flight regime, and for generating a signal in response to the rotorcraft entering the selected flight regime; and
   a means for continually perturbing the rotor disk in response to the signal that the rotorcraft has entered the selected flight regime.

2. The control system according to claim 1, wherein the means for continually perturbing the rotor disk generates an oscillatory cyclic input.

* * * * *